United States Patent
Gatto et al.

(10) Patent No.: US 11,242,113 B2
(45) Date of Patent: Feb. 8, 2022

(54) CHILD'S RIDING BIKE THAT CONVERTS BETWEEN A BALANCE BIKE AND A PEDAL-POWERED BICYCLE

(71) Applicant: MGA Entertainment, Inc., Chatsworth, CA (US)

(72) Inventors: Jeff Gatto, Lyndhurst, OH (US); Eric Fobean, Stow, OH (US)

( * ) Notice: Subject to any disclaimer, the term of this patent is extended or adjusted under 35 U.S.C. 154(b) by 0 days.

(21) Appl. No.: 16/666,312

(22) Filed: Oct. 28, 2019

(65) Prior Publication Data

US 2020/0148302 A1 May 14, 2020

Related U.S. Application Data

(60) Provisional application No. 62/757,285, filed on Nov. 8, 2018.

(51) Int. Cl.
*B62M 3/00* (2006.01)
*B62K 13/00* (2006.01)
*B62K 9/00* (2006.01)
*B62K 15/00* (2006.01)

(52) U.S. Cl.
CPC .......... *B62M 3/00* (2013.01); *B62K 9/00* (2013.01); *B62K 13/00* (2013.01); *B62K 15/00* (2013.01); *B62K 2015/003* (2013.01)

(58) Field of Classification Search
CPC . B62M 3/00; B62M 3/08; B62M 3/02; B62K 13/00; B62K 15/00; B62K 9/00; B62K 2015/003
USPC .............................................. 74/594.4, 594.7
See application file for complete search history.

(56) References Cited

U.S. PATENT DOCUMENTS

| 567,161 | A | | 9/1896 | Le Grand Pierce | |
|---|---|---|---|---|---|
| 1,276,139 | A | | 8/1918 | Warren | |
| 2,384,139 | A | | 8/1943 | Schwinn | |
| 4,338,829 | A | * | 7/1982 | Ozaki | B62M 3/08 |
| | | | | | 74/560 |

(Continued)

FOREIGN PATENT DOCUMENTS

| CN | 1814499 | A | * | 8/2006 |
|---|---|---|---|---|
| CN | 107187536 | A | * | 9/2017 |

(Continued)

OTHER PUBLICATIONS

Translation of CN 1814499A, Li, Aug. 0, 2006 (Year: 2006).*
EPO Machine Translation of CN208198692 (U), Li et al., Dec. 7, 2018 (Year: 2018).*

*Primary Examiner* — Vinh Luong
(74) *Attorney, Agent, or Firm* — Hansen IP Law PLLC

(57) ABSTRACT

A child's riding vehicle can be quickly reconfigured between a balance bike configuration and a pedal-powered bicycle configuration, suitable for children of different ages, without removing any parts to be stored separately. The pedal crank arms can be repositioned on the crank and the pedal axles can be pivoted so that in the balance bike configuration: the pedal crank arms are positioned adjacent to one another and generally upward; the pedal axles are pointed mostly rearwardly but also slightly inwardly rather than extending transversely side-to-side; and the crank arms and pedal axles are telescoped in. The result is that in the balance bike configuration the pedals and crank arms are compacted and folded out of the way so as not to interfere with the child riding the vehicle.

5 Claims, 12 Drawing Sheets

(56) References Cited

U.S. PATENT DOCUMENTS

| | | | |
|---|---|---|---|
| 5,273,300 A * | 12/1993 | Wells | B62K 9/02 |
| | | | 280/259 |
| 5,458,022 A | 10/1995 | Mattfeld et al. | |
| 6,637,292 B2 | 10/2003 | Chu | |
| 7,891,271 B2 | 2/2011 | Grant | |
| 8,328,216 B2 | 12/2012 | Lee | |
| 8,707,825 B2 | 4/2014 | Shiu et al. | |
| 9,284,015 B2 | 3/2016 | Thompson | |
| 9,669,891 B2 | 6/2017 | Evans | |
| 9,714,065 B2 | 7/2017 | Mondello | |
| 2003/0033902 A1* | 2/2003 | Lee | B62M 3/08 |
| | | | 74/594.7 |
| 2004/0007089 A1* | 1/2004 | Fan | B62K 15/00 |
| | | | 74/594.1 |
| 2004/0201199 A1 | 10/2004 | Liebetrau et al. | |
| 2010/0192722 A1* | 8/2010 | Shiu | B62K 13/00 |
| | | | 74/594.7 |
| 2012/0167709 A1 | 7/2012 | Chen et al. | |
| 2014/0274582 A1 | 9/2014 | Simmons | |
| 2015/0035248 A1* | 2/2015 | Baron | B62K 15/00 |
| | | | 280/259 |
| 2016/0001843 A1 | 1/2016 | Evans | |
| 2018/0237097 A1* | 8/2018 | Blake | B62K 15/00 |

FOREIGN PATENT DOCUMENTS

| | | | | |
|---|---|---|---|---|
| CN | 208198692 U | * | 7/2018 | B62K 9/02 |
| WO | WO00/26080 | | 5/2000 | |

* cited by examiner

CHILD'S RIDING BIKE THAT CONVERTS BETWEEN A BALANCE BIKE AND A PEDAL-POWERED BICYCLE

CROSS-REFERENCE TO RELATED APPLICATIONS

This application claims the benefit of U.S. Provisional Patent Application Ser. No. 62/757,285 filed Nov. 8, 2018 which is incorporated by reference herein in its entirety.

BACKGROUND OF THE INVENTION

1. Field of the Invention

This invention relates to the field of children's bicycles. More particularly, this invention relates to the field of a child's riding bike or vehicle that converts between a balance bike and a pedal-powered bicycle.

2. Description of Related Art

Balance bikes are bicycles that lack pedals, and usually lack a chain or other drive components normally associated with pedal drive systems. They are used by small children so that children can become accustomed to balancing and steering a bicycle without also dealing at the same time with the complicating factor of attempting to use the pedals to power the bike forward. Balance bikes typically allow the child's feet to comfortable reach the ground while the child sits on the seat of the bike. The child can keep his feet at least lightly on the ground while his parent pushes the bike from behind or while the bike coasts on a slight downhill, as the child learns to balance the bike. As the child becomes comfortable with balancing the moving bicycle as it coasts forward, he simply lifts his feet up off the ground.

A number of bicycles have been proposed that convert from a child's balance bike to a pedal-powered bicycle via a removable pedal crank set. Examples of such convertible bikes are disclosed in: U.S. Pat. No. 9,714,065 to Mondello; U.S. Pat. No. 9,669,891 to Evans; Patent Publication No. 2004/0201199 by Liebetrau et al.; and Patent Publication No. 2014/0274582 by Simmons.

SUMMARY OF THE INVENTION

One disadvantage to the prior art bikes that feature removable pedal crank sets is that the removable pieces can get misplaced or lost between the time that the parent assembles the balance bike for the child for the first time, and the time that the child has grown and developed to the point that the parents are ready to convert the bike to a pedal-powered bike. Another disadvantage is that the bicycle does not convert quickly for use by children of different ages, in order to serve as both a balance bike for a very young child and also as a pedal bike for an older child within the same family.

The present invention is of a child's riding vehicle or bicycle that quickly and easily converts between a balance bike and a pedal-powered bicycle, and which does so without the need to remove and store any parts separately from the bike.

In an illustrative embodiment, the child's riding vehicle includes the standard components of a frame, a front wheel and a rear wheel, and a set of handlebars to steer the front wheel. The vehicle also includes: (1) left and ride side pedal crank arms, with a first one of the pedal crank arms being quickly and easily removed from the crank shaft or axle and placed on the crank shaft at either the same rotational position on the crank shaft as the other pedal crank arm in the balance bike mode, or 180° opposed from that other pedal crank arm for use in the bicycle mode; and (2) specially constructed left and right side pedals and pedal crank arms.

In the illustrative embodiment, the specially constructed left and right side pedals and pedal crank arms incorporate several mechanical features that allow the pedal crank set to be compacted, folded, reconfigured, or otherwise reduced in size, moved out of the way, and retained in the out-of-the-way position. The result is that in the balance bike mode or configuration the pedal crank set presents a small and out-of-the-way profile so that the bike functions as a balance bike suitable for very small children who are learning how to balance a bicycle. From that configuration, the bike converts quickly and easily to normal functioning as a pedal-powered bicycle. The features of the pedals and pedal crank arms which allow the crank set to be effectively reduced in size, can be used with either the balance bike such as disclosed herein or on other bikes or vehicles.

In the discussion that follows, the direction of travel of the bicycle will be assigned the X-dimension, the vertical direction will be assigned the Z-dimension, and the direction lateral to the direction of travel will be assigned the Y-dimension, with the +Y direction being away from the bicycle toward the left of a rider. This dimensional labeling convention is illustrated in FIG. 1.

A first mechanical feature of the invention as disclosed in the illustrative embodiment that allows the bike to quickly and easily convert from a balance bike mode or configuration to a pedal-powered bicycle mode or configuration, is that one of the pedal crank arms can be unbolted and removed from the crank, rotated 180°, and replaced and re-bolted back onto the crank, thus quickly changing the pedals from being fixed at rotational positions 180° apart from each other as in a conventional bicycle, to a rotational position 0° apart from each other. Thus, whereas a standard bicycle has one crank arm at the 12 o'clock position while the other crank arm is at the 6 o'clock position, in the illustrative embodiment both crank arms can be rotated to and retained at approximately the 12:30 position as viewed from the left side of the bicycle. The result is that the pedal crank arms and the pedals which are attached thereto can be rotated into a position which is substantially out of the way of the child who is using the bike as a balance bike, and retained in that position.

A second mechanical feature is that, from the pedal-powered bicycle configuration, the pedal axle together with the distal end of each crank arm rotates 90° or more about the longitudinal axis of the crank arm and at least loosely locks into that position. The pedal axle thereby rotates to now extend in the longitudinal and/or vertical directions depending on the rotational position of the crank, rather than extending laterally (side-to-side). In other words, if the two bicycle wheels in their straight-ahead positions generally define an X-Z plane, the pedals rotate from a normal bicycle mode position in which the pedal axles extend in the Y directions orthogonal to that X-Z plane, to a balance bike mode position in which the pedal axles are parallel to that X-Z plane. The result is that the lateral width of the bicycle as measured at the lateral-most extent of the pedals (pedal-to-pedal) is greatly reduced.

A third mechanical feature is that when the pedal crank arms have been rotated such that the pedal axles are parallel to the X-Z plane as described in the preceding paragraph, the pedal can be locked in a rotational position such that the foot contact surface of the pedal, which generally defines what we will call the pedal foot support plane, now is vertical rather than horizontal. The result is that the width of the pedals no longer extend in the Y direction, thus reducing the lateral width of the bicycle as measured from the Y-most extents of the pedals.

A fourth mechanical feature is that the two pedal crank arms telescope and lock into respective telescoped-in positions, thus effectively reducing the lengths of the crank arms and bringing the pedals closer to the crank axle.

A fifth mechanical feature is that each pedal axle telescopes and locks into a telescoped-in position, thus effectively reducing the distance from the crank arm to the distal end of the pedal.

Exemplary embodiments of the invention will be further described below with reference to the drawings, in which like numbers refer to like parts. The drawing figures might not be to scale, and certain components may be shown in generalized or schematic form and identified by commercial designations in the interest of clarity and conciseness.

DETAILED DESCRIPTION OF THE PREFERRED EMBODIMENTS

Figure 1:
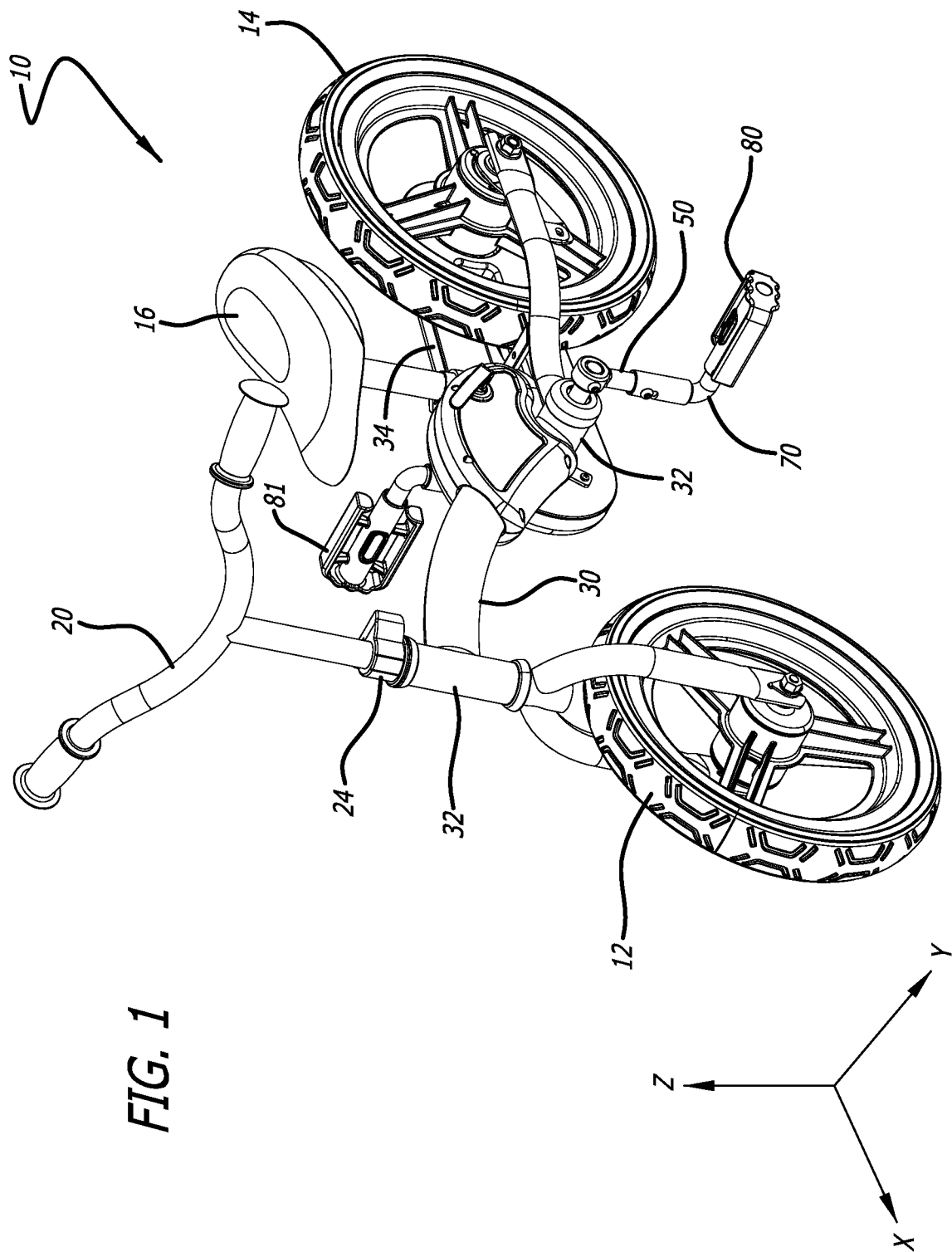
FIG. 1 is a front left oblique view of a convertible bicycle of the invention according to an illustrative embodiment, in its conventional bicycle configuration.

FIG. 1 is a front left oblique view of a convertible bicycle or vehicle 10 of the invention according to an illustrative embodiment, with the convertible bicycle in its conventional bicycle configuration or mode. In this configuration the bicycle functions as a conventional pedal-powered bicycle, with the child pedaling the bicycle in order to power it forward. In the figure the X-, Y-, and Z-axes have been labeled for discussion purposes. For discussion, the plus (+) Y direction will be the direction in which the Y-axis arrow points, i.e., award from the bicycle toward the bicycle's left side. The minus (−) Y direction will be the direction opposite to which the Y-axis arrow points, i.e., away from the bicycle toward the bicycle's right side.

Bicycle 10 includes a front wheel 12, a rear wheel 14, a rider seat 16, an adjustable seat stem 17 which is clamped at a desired height by a clamp such as a quick release clamp mechanism 18, a pair of handlebars 20, and a handlebar stem 22 which is clamped at a desired height by a clamp such as quick release clamp mechanism 24. The bicycle also includes a frame 30 including a bottom bracket 32 which houses the crank. This much is conventional. A chain guard 34 preferably covers the bicycle's chain (not shown) and front and rear sprockets (not shown) for safety.

Figure 3:
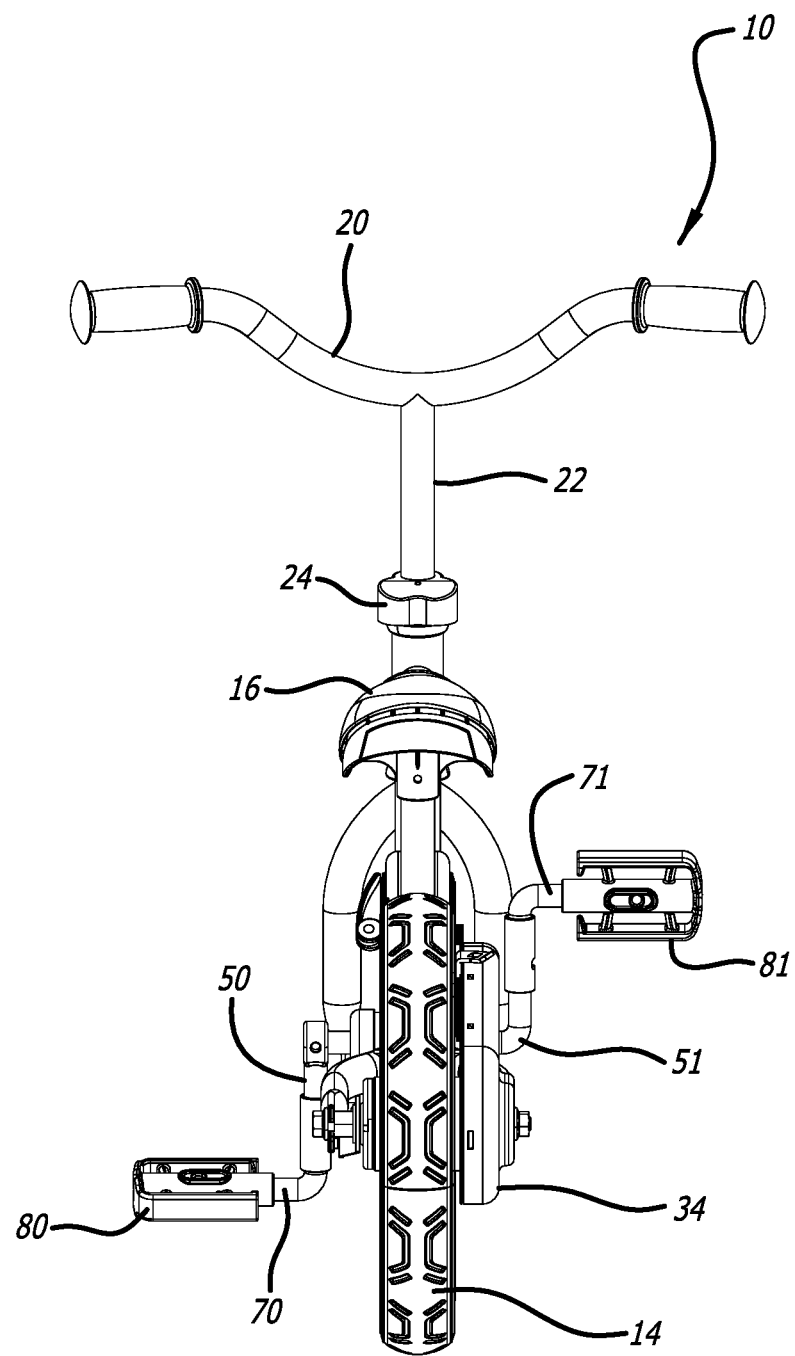
FIG. 3. is a rear elevation view of the convertible bicycle of FIG. 1.

Bicycle 10 further has: a left side pedal 80 mounted on a left side pedal axle 70; a left side pedal crank arm or simply crank arm 50; a right side pedal 81 mounted on a right side pedal axle 71; and a right side pedal crank arm or simply crank arm 51 (FIG. 3). The left and right side pedal axles 70, 71 extend outwardly in the ±Y directions, generally orthogonal to their respective crank arms 50, 51, and orthogonal to a center line of the bicycle which is along the direction of travel of the vehicle. In this context, a pedal extending outwardly means that the distal end of the pedal (the end farther away from the crank arm) is farther away from a center line or an X-Z plane of the bicycle than is the proximal end of the pedal (the end that is adjacent to the crank arm).

Figure 2:
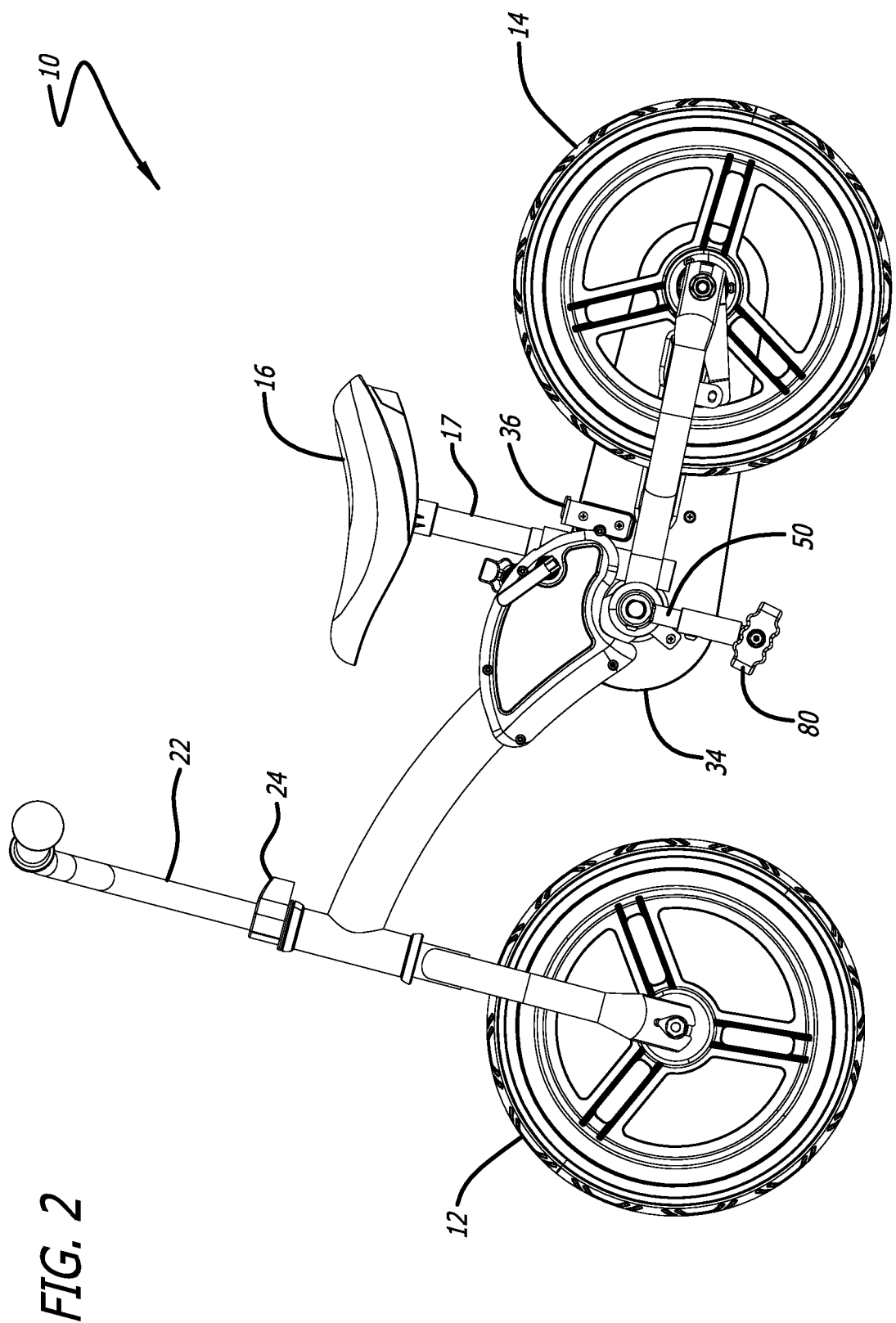
FIG. 2 is left side elevation view of the convertible bicycle of FIG. 1.

FIG. 2 is left side elevation view of the convertible bicycle of FIG. 1. Seat stem 17 telescopes into and out of a portion of frame 30 so that it is adjustable in height, secured at a desired position by a clamp such as quick release 18. Seat stem 17 is shown in its fully extended, or nearly fully extended, position for use in the pedal-powered bicycle mode. Also seen is clip 36 which is mounted on chain guard 34. As will be described in greater detail later, clip 36 retains the pedals in a predetermined rotational position when the bike is being used as a balance bike.

Figure 4:
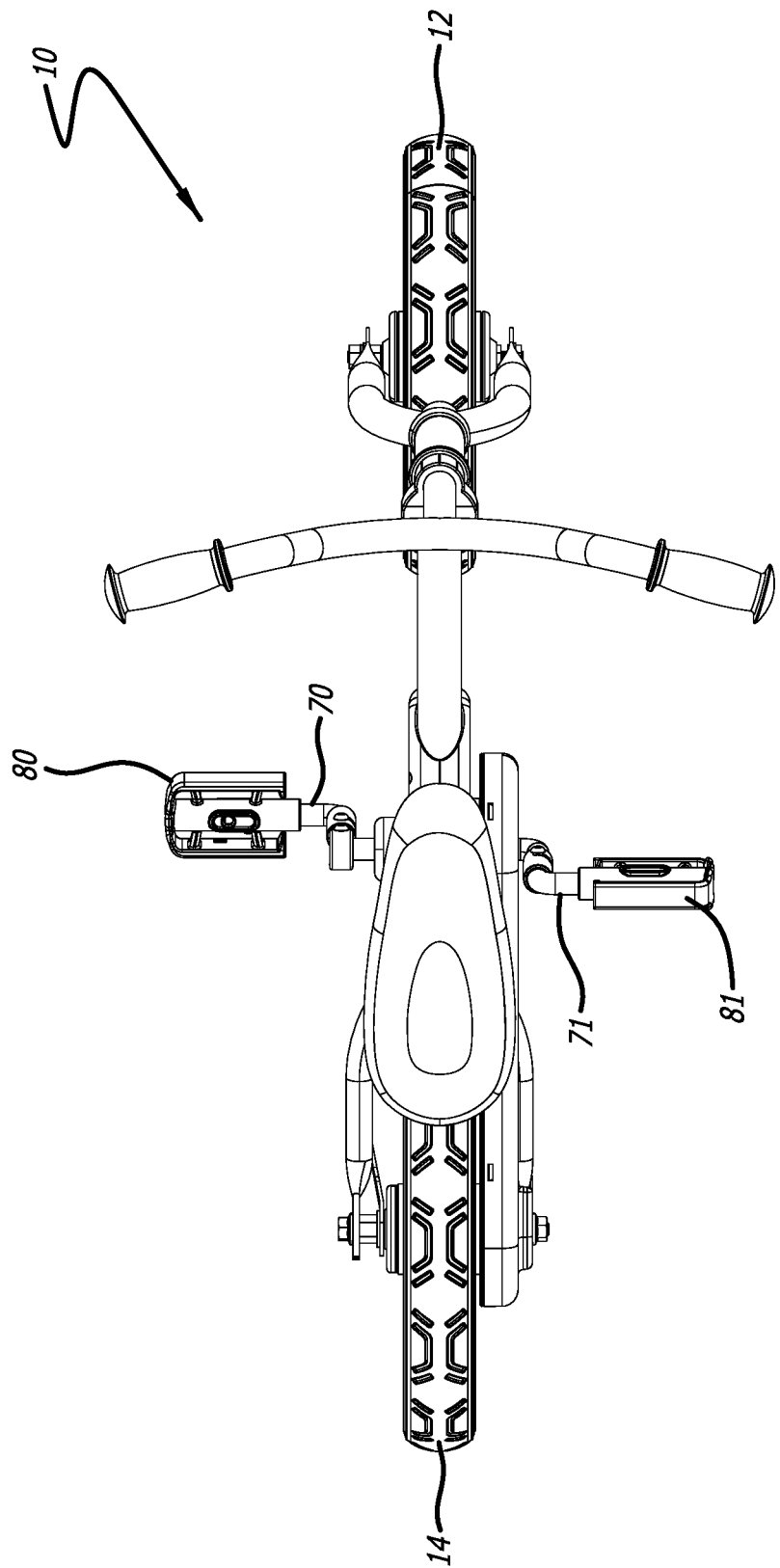
FIG. 4 is a top plan view of the convertible bicycle of FIG. 1.

FIG. 3. is a rear elevation view of the convertible bicycle 10 of FIG. 1, and FIG. 4 is a top plan view thereof.

As illustrated in FIGS. 1-4, the bike is in its pedal-powered bicycle configuration or mode. In this configuration the bike operates as a standard pedal-powered bicycle. The left and right crank arms 50, 51 are 180° out of rotational phase with one another. They are parallel to each other and extend in opposite directions. The pedal axles extend in the Y directions, with the left side pedal axle 70 extending in the +Y direction, and the right side pedal axle 71 extending in the −Y direction. This can be called the "normal" position of the pedals 80, 81, pedal axles 70, 71, and pedal crank arms 50, 51. The pedals 80, 81 are free to rotate about their respective pedal axles 70, 71. As a user pedals the bike using pedals 80, 81, the user's pedaling force is transmitted through crank arms 50, 51 to crank 40 to which the crank arms are affixed, providing the motive force for propelling the bicycle 10 forward.

Figure 5:
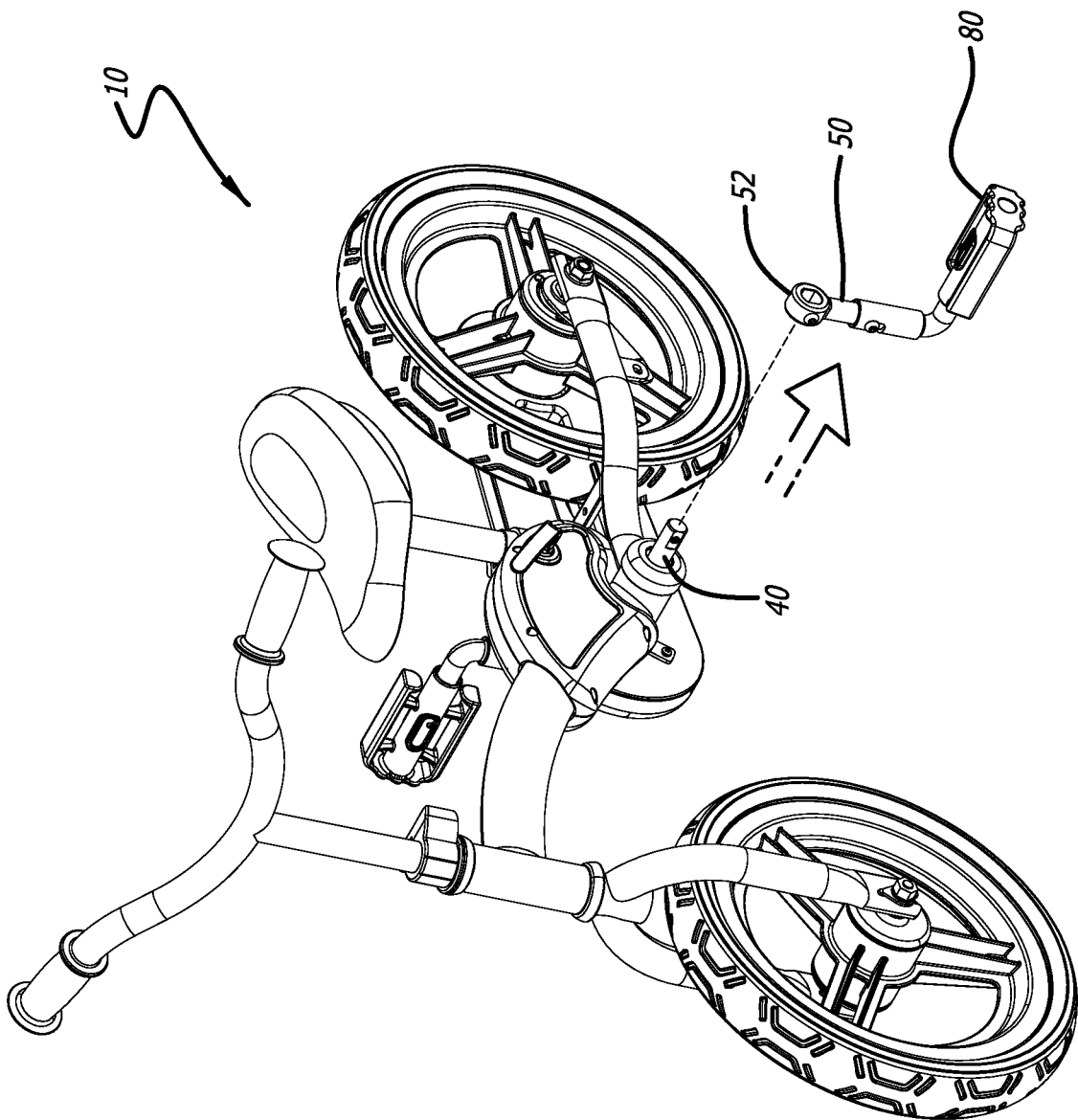
FIG. 5 is a front left oblique view of the convertible bicycle of FIG. 1, with the left side pedal and crank arm having been removed.

FIG. 5 is a front left oblique view of the convertible bicycle 10 of FIG. 1, with the left side pedal 80 and left side crank arm 50 having been removed to begin the process of converting the bike from its pedal-powered configuration to its balance bike configuration. The mechanism by which the pedal crank arm 50 is removed from crank 40 is shown in greater detail in FIG. 6.

Figure 6:
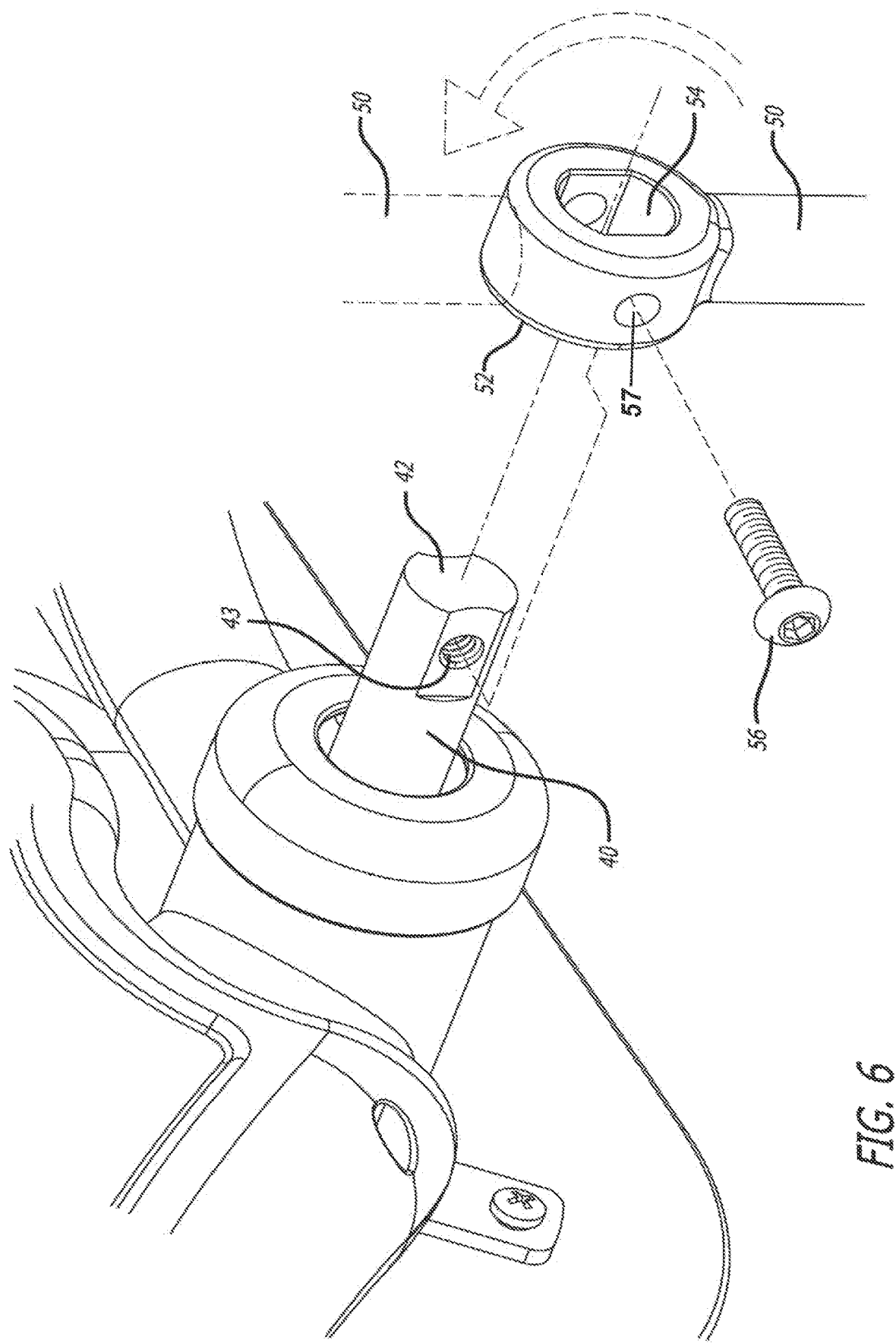
FIG. 6 is an exploded closeup in the area of the pedal crank and left side pedal crank arm, showing the crank arm having been removed from the crank, which is a first step in converting the vehicle from its pedal-powered bicycle configuration to its balance bike configuration.

FIG. 6 is an exploded closeup in the area of the crank 40 and left side pedal crank arm 50, showing the crank arm 50 having been removed from crank 40, which is a first step in converting the vehicle from its pedal-powered bicycle configuration to its balance bike configuration. Threaded bolt 56 or other fastener extends through hole 57 in collar 52 and into a mating threaded hole 43 in the distal end 42 of crank 40. Distal end 42 has features which define a male socket, which mates with features in collar 52 that define a female socket 54 in crank arm 50. To begin the process of converting the bike from a pedal-powered bicycle to a balance bike, the user first removes bolt or screw 56 which in the illustrative embodiment is an Allen head socket screw, thereby disengaging screw 56 from hole 43 in crank 40. The user then removes pedal crank arm 50 including collar 52 by pulling crank arm 50 away from, and off of, crank 40. The user then rotates crank arm 50 by 180° and reinstalls crank arm 50 onto crank 40 in the new position, and secures the crank arm in that position by reinserting bolt 56 and tightening it. The new position of crank arm 50 is shown in dashed lines. In this position the crank arms 50, 51 are rotationally in phase with each other, i.e., they are at 0° with respect to each other. They are parallel to each other and extend in the same direction. Crank arm 50 has thus been repositioned and reinstalled from a position which will be deemed a first position shown in solid lines in which the crank arms are parallel and extend in opposing directions for the bike to be used as a pedal-powered bicycle, to what will be deemed a second position shown in dashes lines in which the crank arms are parallel and extend in a common direction for the bike to be used as a balance bike. The left side pedal crank arm 50 thus defines a repositionable crank arm that is removable from the crank 40 and repositionable on the crank at either one of the first position for the bike to be used as a pedal-powered bicycle, or the second position for the bike to be used as a balance bike.

As used herein and in the claims, the terms "0" and "180° " do not necessarily mean exactly 0° and 180°, and can include minor variations therefrom.

The bolt 56 and the socket features of crank 40 and collar 52 function as a lock, allowing the user to lock the left and right side pedal crank arms into either the 0° or 180° positions, relative to one another.

Figure 7:
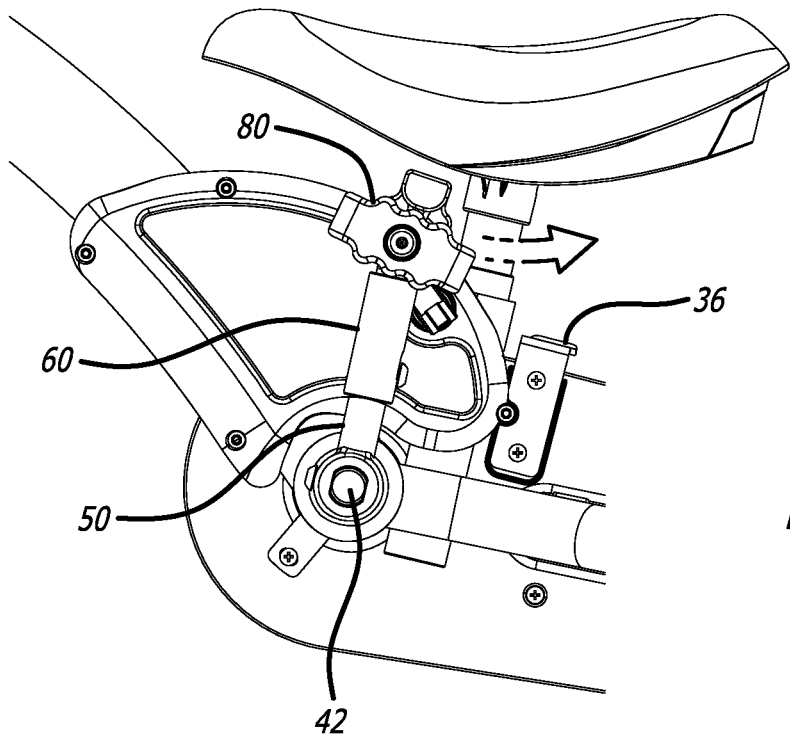
FIG. 7 is a closeup view of the crank area of the convertible bicycle of FIG. 1 after the left side crank arm has been repositioned on the crank, in a second step in transitioning the bicycle from conventional bicycle configuration to balance bike configuration.

Alternatively, other mechanisms for locking the crank arms into either the 0° or 180° positions could be used, including but not limited to a mechanism by which telescoping left and right side portions of crank 42 can rotate relative to each other when not locked together via a bolt, such as shown and described in FIGS. 7, 18, and 19 of Provisional Patent Application No. 62/757,285 filed Nov. 8, 2018 of which this application claims the benefit, and which is incorporated by reference as if set forth herein in its entirety.

FIG. 7 is a closeup view of the crank area of the convertible bicycle of FIG. 1 after the left side crank arm 50 has been repositioned on the crank, in a second step in transitioning the bicycle from conventional bicycle mode to balance bike mode, and the seat has been lowered. In this figure the crank arms 50, 51 extend in the same direction, i.e., they are rotationally at 0° degrees with respect to each other. The pedal axles 70, 71 still extend in the Y direction contributing their full lengths to the overall width of the bicycle as measured at the pedals. Clip 36 is visible.

An arrow indicates the next step in transitioning the bicycle to its balance bike mode, which is to rotate the pedal axles 70, 71 generally rearward so that they extend mostly along an X-Z plane instead of in the Y direction, but preferably also slightly inwardly in the Y direction, i.e., slightly toward a center line of the bicycle.

Figure 8:
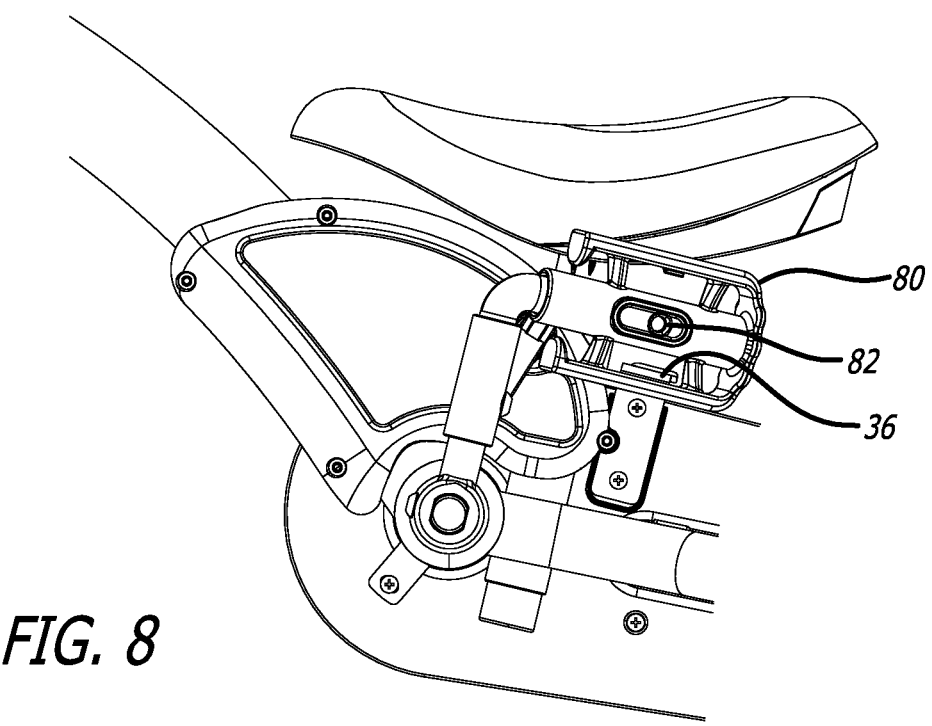
FIG. 8 is closeup view similar to that of FIG. 7, but after the pedal axles have been rotated rearwardly so that the pedal axles no longer extend outwardly to the sides, and instead now extend generally rearwardly in an X-Z plane but slightly inwardly; the bike is now in its balance bike configuration.

FIG. 8 is closeup view similar to that of FIG. 7, but after the pedal axles 70, 71 have been rotated rearwardly so that the pedal axles no longer extend out to the sides (in the Y direction). Instead, they now extend generally rearwardly in an X-Z plane but slightly inwardly. Additionally, the pedals 80, 81 have been rotated so that they extend vertically instead of horizontally, and are locked into that position. The pedals 80, 81 and pedal crank arms 50, 51 are said to be in the "stowed" position. Bike 10 is now in its balance bike configuration, ready to be used as a balance bike.

Folding bicycle pedals are known in which a distal portion of the pedal including the pedal axle folds upward, and a proximal portion (the portion adjacent to the crank arm) of the pedal including its pedal axle remains in its normal positions, i.e., extending laterally outwardly from the pedal crank. In contrast, the pedal axle rotating mechanism disclosed herein allows the entire pedal and the entire pedal axle to be rotated as seen in the figure, such that none of the pedal axle extends outwardly away from the center line of the bicycle. When rotated to its stowed position, the pedal axle does not extend substantially outwardly. Instead, the entire axle extends in the X-Z plane or slightly inwardly toward the center line of the bicycle. Similarly, the entire pedal does not extend substantially outwardly. Instead, the entire pedal platform is vertical.

The mechanism seen in FIGS. 12 and 13, which will be described in greater detail below, constitutes a left side pedal pivot that allows the left side pedal axle 70 to pivot or rotate from its normal position extending outwardly in the +Y direction, to a position in which the left side pedal axle 70 extends parallel to an XY-plane or slightly inwardly in the −Y direction, and is loosely retained thereat. Similarly, the corresponding mechanism for the right side crank arm 51 constitutes a right side pedal pivot that allows the right side pedal axle 71 to pivot or rotate from its normal position extending outwardly in the −Y direction, to a position in which the right side pedal axle 51 extends parallel to the XY-plane or slightly inwardly in the +Y direction and is loosely retained thereat.

The topmost surfaces 89 of a pedal 80 where the rider places his feet define a pedal platform. Most pedals for children's bicycles have identical top and bottom surfaces so that it does not matter in what position the pedal has been spun when the child gets on the bicycle and begins riding. The pedals thus have a top pedal platform and a bottom pedal platform.

Figure 9:
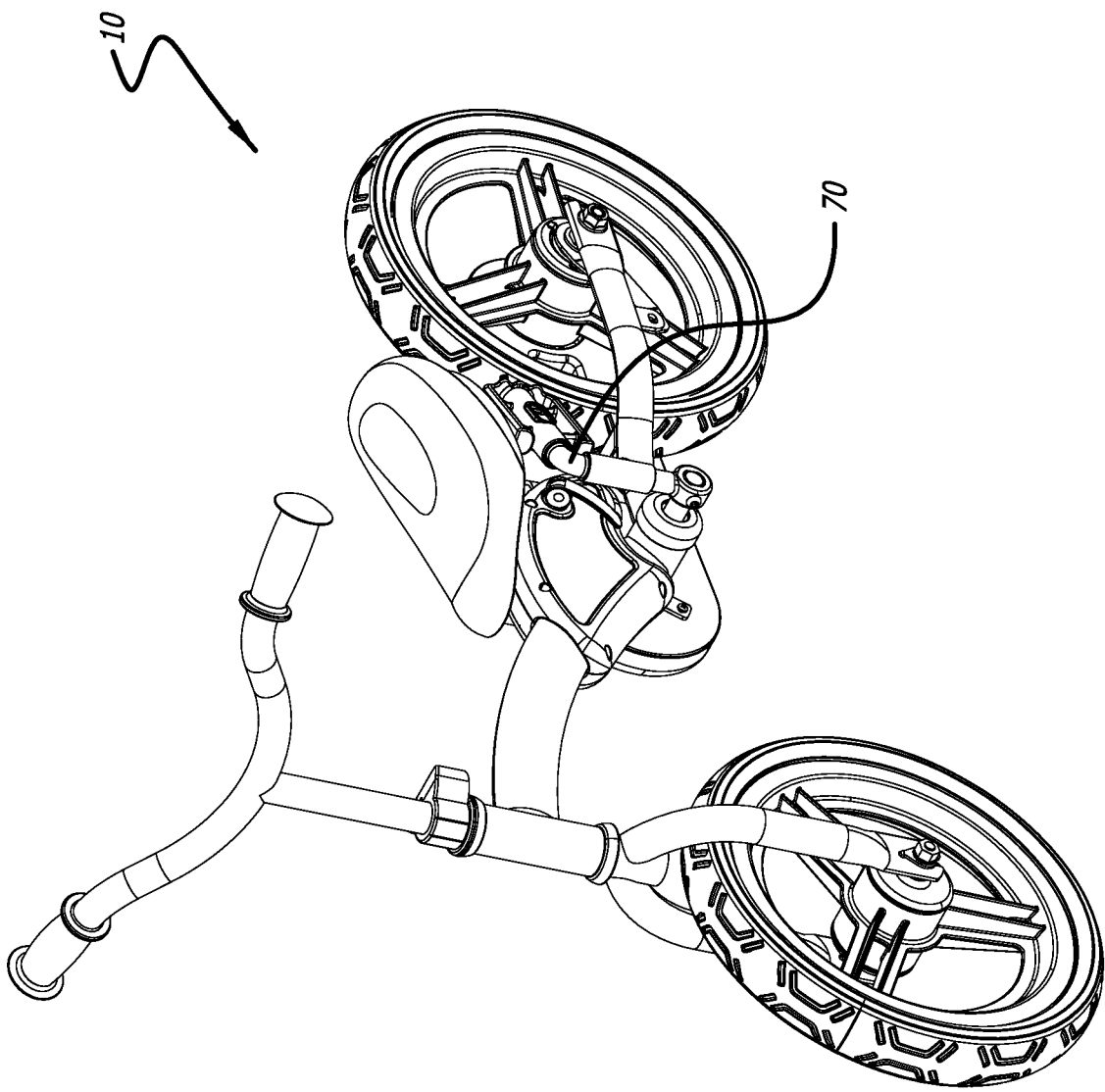
FIG. 9 is a front left oblique view of the overall convertible bicycle of FIG. 8.

FIG. 9 is a front left oblique view of the overall convertible bicycle of FIG. 8. The bike is in its balance bike configuration.

Figure 10:
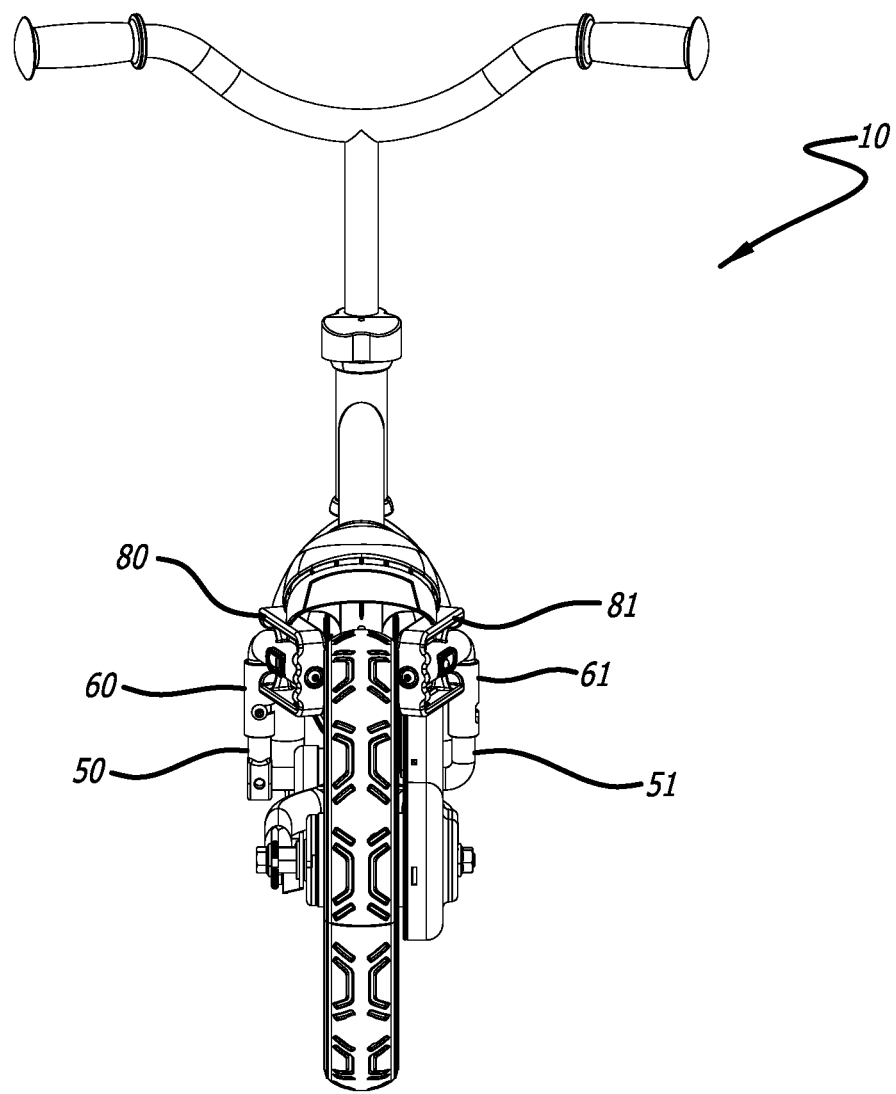
FIG. 10 is a rear elevation view of the convertible bike of FIG. 9.

FIG. 10 is a rear elevation view of the convertible bike 10 of FIG. 9.

Figure 11:
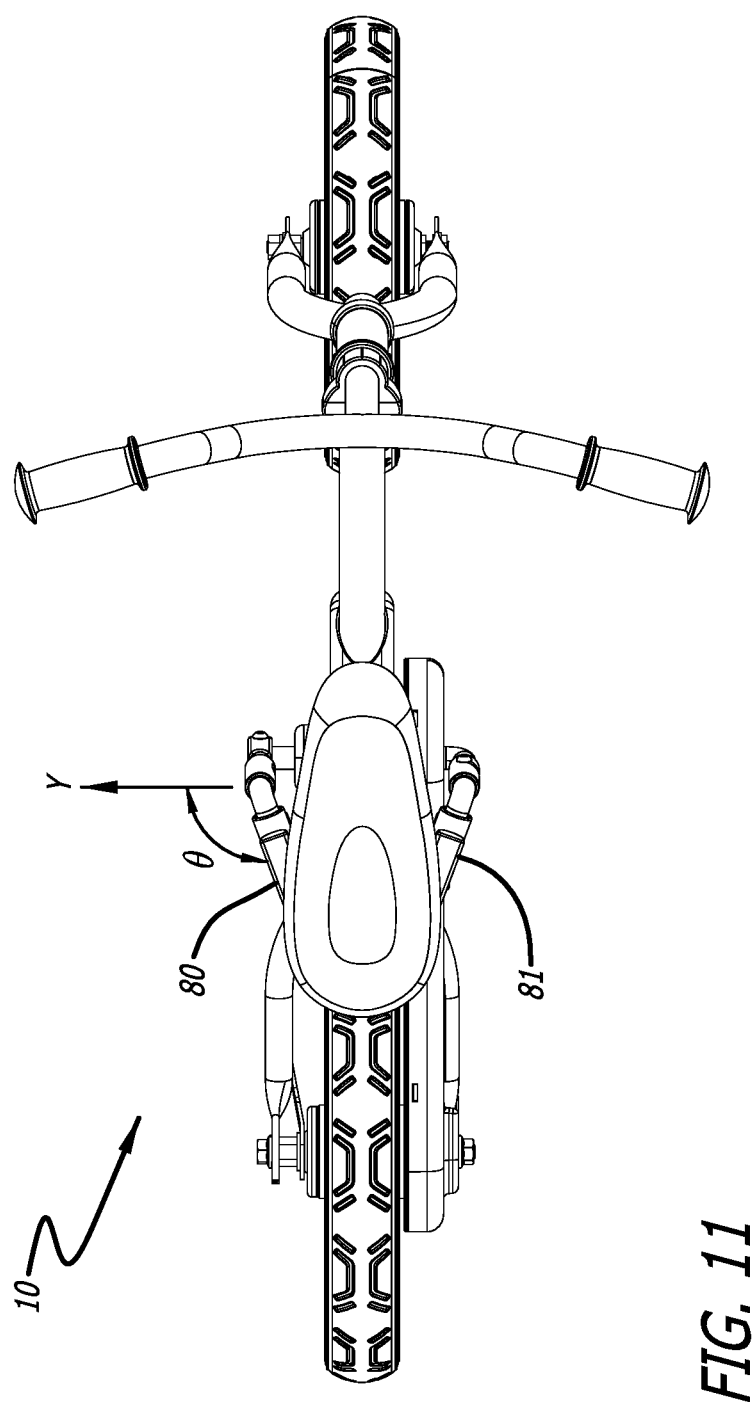
FIG. 11 is a top plan view of the convertible bike of FIG. 9.

FIG. 11 is a top plan view of the convertible bike 10 of FIG. 9. In this view it can be seen that the pedal axles 70, 71 extend generally rearwardly in the X-Y plane but also slightly inwardly in the Y direction. The slightly inward direction of the pedal axles 70, 71 and hence of pedals 80, 81 helps to ensure that the pedals are as far out of the way as possible and will not interfere with the young rider's legs as he rides the bike in the balance bike configuration. Angle θ is the angle between the +Y direction (transverse to the bike) and the direction in which pedal axle 70 extends.

Figure 12:
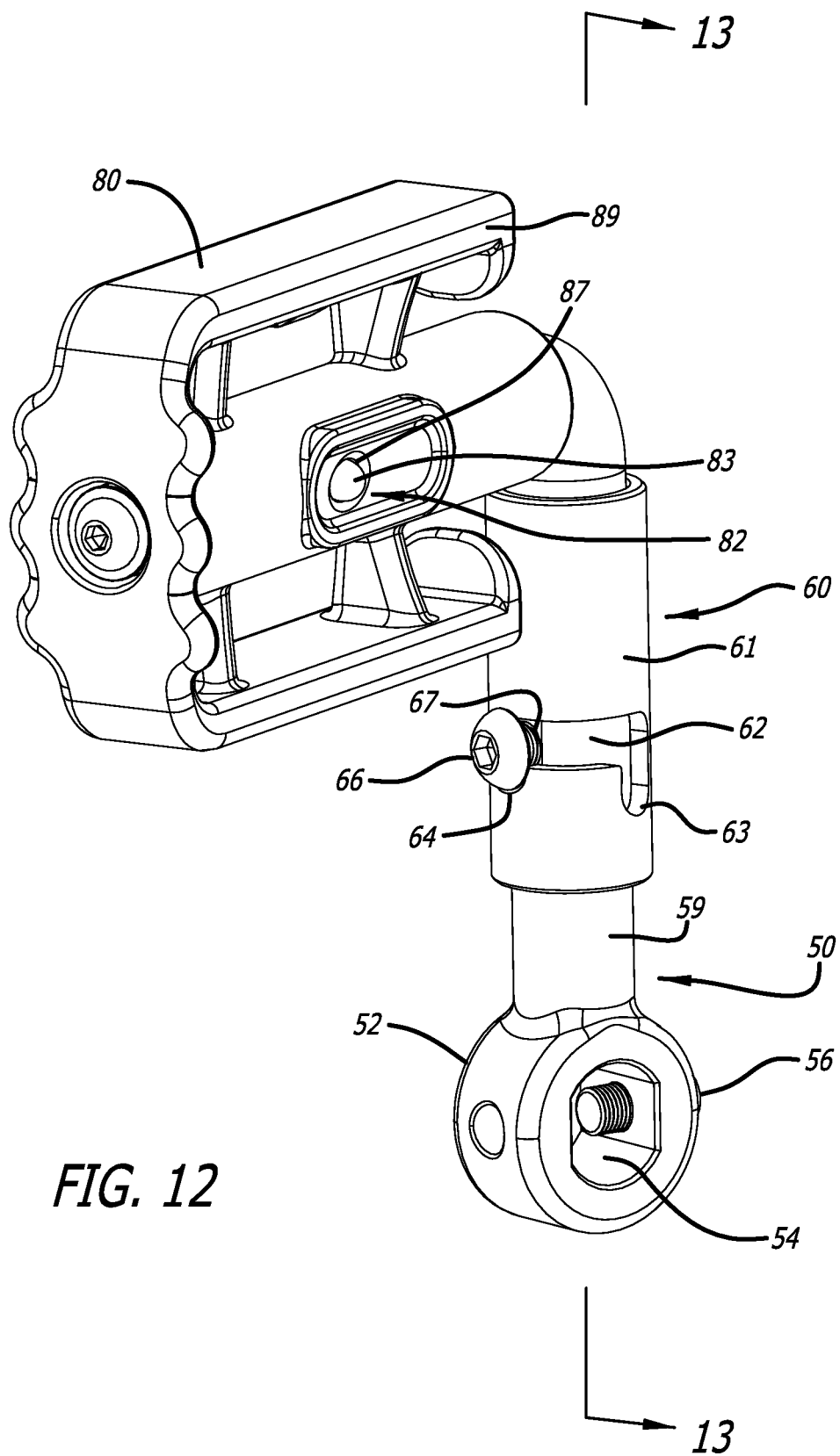
FIG. 12 is a perspective view showing left side pedal 80 and crank arm 50 of the balance bike of FIG. 1 after the crank arm 50 has been removed from the bike.

FIG. 12 is a perspective view showing left side pedal 80 and crank arm 50 of the balance bike of FIG. 1 after the crank arm 50 has been removed from the bike.

Figure 13:
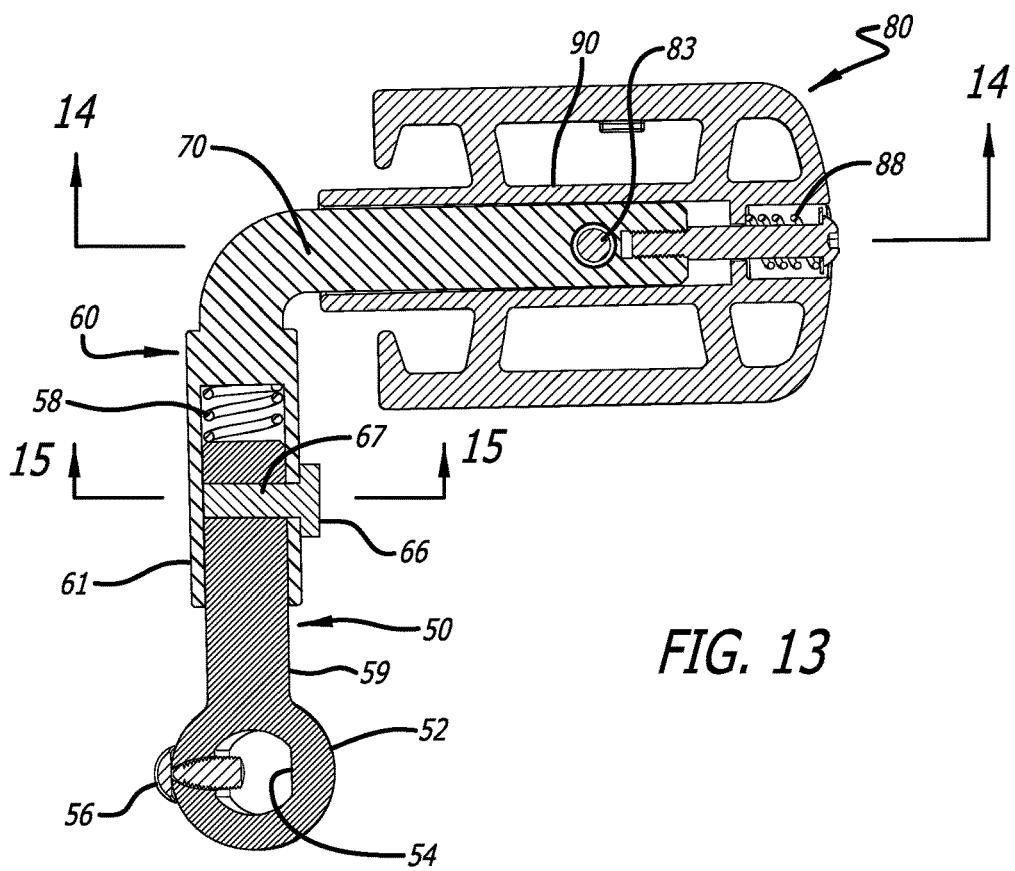
FIG. 13 is a cross-sectional view of the pedal 80 and crank arm 50 of FIG. 12 taken along section line 13-13.

FIG. 13 is a cross-sectional view of the pedal 80 and crank arm 50 of FIG. 12 along section line 13-13.

Figure 14:
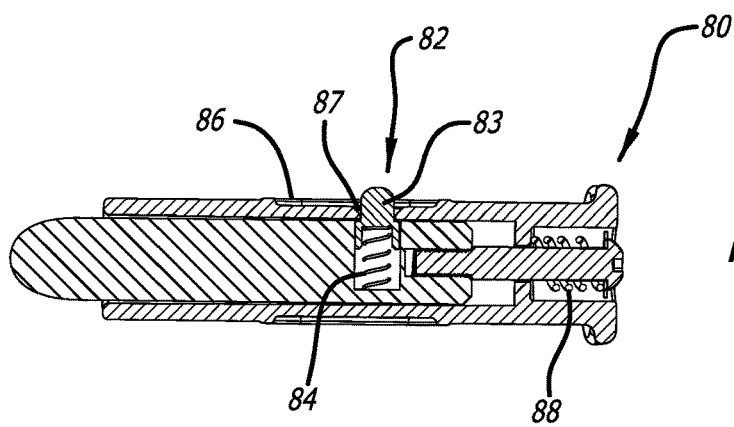
FIG. 14 is a cross-sectional view of the pedal 80 and pedal axle 70 of FIG. 13 taken along section line 14-14.

FIG. 14 is a cross-sectional view of the pedal 80 and pedal axle 70 of FIG. 13 taken along section line 14-14.

Figure 15:
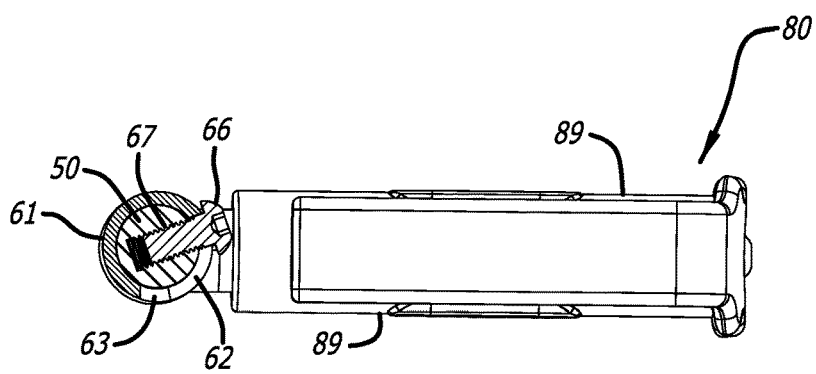
FIG. 15 is a cross-sectional view of the crank arm 50 and pedal 80 of FIG. 12 taken along section line 15-15.

FIG. 15 is a cross-sectional view of the crank arm 50 and pedal 80 of FIG. 13 taken along section line 15-15.

The mechanism by which the pedal axles rotate and lock loosely into either of their two positions is seen in FIGS. 12, 13, and 14. Crank arm 50 includes a proximal portion 59 and a distal portion 60. Distal portion 60 includes a collar portion 61 that encircles proximal portion 59. Collar 61 has a circumferential slot 62, a large notch or detent 63, and a smaller notch or detent 64 into which the shaft of pin, bolt, or screw 66 can rest. Stated another way, a slot has a transverse segment 62, a first longitudinal segment 63, and a second longitudinal segment 64. A spring 58 biases the distal portion 60 including collar 61 away from the proximal portion 59 of crank arm 50 and toward an extended position. FIG. 12 shows the crank arm 50 in its shortened position, which corresponds to the balance bike configuration. In this configuration the shaft of screw 66 is loosely held in notch 64 due to the bias exerted by spring 58.

To extend the crank arm 50 for use in the pedal-powered bicycle configuration, the user simply rotates pedal axle 70 toward the left as seen in FIG. 12. The force applied by the user easily overcomes the bias force from spring 58, and collar 61 rotates with pedal axle 70 allowing the shaft of screw 66 to slide within horizontal slot 62 until it aligns with large notch 63 at which point the bias from spring 58 forces collar 61 outward such that the shaft of screw 66 now rests within notch 63. Crank arm 50 is now locked in its extended position, with axle 70 extending outwardly from bike 10, for use in the pedal-powered bicycle configuration. Notches 63 and 64 are preferably rotationally more than 90° apart, so that in the balance bike configuration pedal axles 70, 71 are pointed slightly inward as seen in FIG. 11. More particularly, notches 63 and 64 are preferably rotationally at least 100°-145° apart, and more preferably 105°-120° apart, resulting in an angle θ (FIG. 11) of at least 100°-145°, and more preferably 105°-120°.

In one aspect, therefore, the pedal pivot includes an outer tube or collar 61 and an inner tube, rod, or other member 59 concentric therewith, the outer tube 61 and the inner member 59 being rotatable 90° or more relative to one another between the normal position and the stowed position. The pedal pivot is loosely held in the stowed position, requiring only a modest applied rotational force to move the pedal pivot out of the stowed position. In contrast, the pedal pivot is positively held in the normal position and locked thereat, requiring the user to manually manipulate an unlatching mechanism in order to move the pedal pivot from its normal position to its stowed position. This lock or latch prevents the pivot from accidentally rotating out of its normal position when the bike is being used as a pedal-powered bicycle.

This mechanism as described in the preceding two paragraphs provides the additional advantage of telescoping the two pedal crank arms 50, 51 in to reduce their effective lengths. The shortened crank arm lengths allows the seat 16 to be lowered to a lower height than otherwise possible, while still keeping the uppermost extent of the pedals 80, 81 lower than the bottommost extent of the seat and thus keeping the ends of the pedals tucked in and out of the way from interfering with the rider's legs. In this regard see FIG. 11. Telescopically shortened crank arms 50, 51 thus contribute to the usability of the bike as a balance bike for a very small rider. They also contribute to the overall compactability of the bike for transportation and/or storage.

Additionally, the pedals lock into a vertical configuration, which is the configuration seen in FIGS. 8 and 12. Spring pin mechanism or push button spring pin lock 82 by which the pedals lock into a vertical configuration is illustrated in FIGS. 8, 13, and 14. Spring pin lock 82 includes a spring 84 that biases pin 83 having a rounded button top into a hole 87 in plate 86 or other surface feature of the pedal axle 70. Hole 87 is positioned such that when pin 83 is within hole 87, pedal axle 70 is in its shortened position, and pedal 80 is vertical as seen in FIGS. 8 and 12. This is the balance bike configuration. In this configuration the foot contact surface 89 of the pedal, which generally defines what we will call the pedal foot support plane, is now vertical. The pedals no longer extend outwardly in the ±Y directions away from the bike, thus reducing the lateral width of the bicycle as measured from the Y-most extents of the pedals. The pedals are locked into this position by the spring pin lock 82. In this position the pedals cannot spin about their associated pedal axles. The spring pin locks 82 thus constitute pedal spin locks that prevent the pedals from spinning. They lock the pedals such that the pedal platforms are oriented vertically.

In one aspect, pedal 80 together with its pedal axle 70 has an outer tube 90 and an inner member 70 that resides within outer tube 90 and is concentric therewith. A compression spring 88 biases the outer tube 90 away from inner member 70. The outer tube 90 and inner member 70 having a closer-together position in which the compression spring 88 is relatively more compressed, and a farther-apart position in which the compression spring is relatively less compressed.

To transition the bike from balance bike configuration back to its pedal-powered configuration, a user presses down on the button of pin 83 to move the pin downward away from hole 87. Spring 88 biases pedal 80 outwardly away from pedal crank arm 50 such that once pin 83 is no longer resting in hole 87, pedal 80 moves outwardly under the spring bias force away from crank arm 50 and pin 83 no longer aligns with hole 87. Pedal 80 is now in its extended position and is free to rotate about pedal axle 70.

Locks or locking mechanisms other than spring pin lock 82 could be used to lock the pedals in their vertical configurations.

Clip 36 and its function is seen in FIGS. 7 and 8. Clip 36 is affixed to the bike, and specifically to chain guard 34 in this embodiment. Clip 36 is flexible and resilient, such as being made of a resilient plastic or a thin spring steel, and is thus a spring clip. Spring clip 36 loosely holds right side pedal 81 in place in approximately the 11:30 position as seen from the right side and the 12:30 position as seen from the left side, once the pedals are rotated into its balance bike position as seen in FIG. 8 and positioned under the head of clip 36. The crank arms 50, 51 are near vertical but extend slightly rearwardly, in order to help position the pedals out of the way from possibly interfering with the rider's legs. Hand force is sufficient to either press pedal 81 into its position held loosely by spring clip 36 as seen in FIG. 9, or to remove pedal 81 from that position so that the pedal can be returned to the position seen in FIG. 7. Spring clip 36 thus acts as a retainer that retains the right side pedal 80, which constitutes a retained pedal, in a predefined rotational position about the crank 40 when the bike is being used as a balance bike, and releasably retains the pedal in that position.

Other features that allow the bike to be reconfigured between use by a very young or very small rider, and a larger rider, or to be made compact for transportation and/or storage, include seat stem 17 and handlebar stem 22 which can be raised or lowered and locked in place via quick standard release mechanisms 18 and 24, or similar mechanisms.

As will be appreciated, the convertible child's riding vehicle of the present invention does not require any parts to be removed and retained separately in order for the bicycle to convert from the balance bike mode to the pedal-powered bicycle mode and back again. There are therefore no parts to get misplaced when the vehicle is in one mode or the other. Additionally, the bicycle can be reconfigured within less than two minutes between the two configurations using only an Allen wrench, a screwdriver, or other simple tool depending on the exact type of bolt or screw 56, thus allowing the same bicycle to be quickly reconfigured such as for use by two different riders of different ages within the same family.

As will be further appreciated, the ability of the bike to be reduced in size in several areas constitute advantageous features even if the bike is not going to be used as a balance bike. For example, even if the bike is going to be used only in the pedal-powered bicycle configuration as seen in FIG. 1, the ability to rotate the pedal axles 70, 71 thus significantly reducing the lateral width of the bicycle, and then to even further reduce the space required for the bicycle by moving the pedal crank arms to their relative 0° position as shown in FIG. 8, significantly reduces the space that the bicycle occupies for transportation or storage. When placing bicycles on their sides in the back of a car or SUV, it is the pedals sticking out that cause the greatest complications when attempting to place two or more bicycles on top of each other, as the pedals of the bicycle on top tend to get caught up in the spokes of the bicycle below. The present invention eliminates or significantly reduces this problem, allowing stacked bicycles to be placed into and removed from a car more easily than otherwise possible, and even allows more bicycles to fit within the same space than otherwise possible. The invention also allows a bicycle to be stored in a smaller space inside of, for example, an apartment or garage, than otherwise possible.

In the present embodiment, for safety the bike has a full chain guard 34 that covers not only the top and bottom portions of the chain but also the front and rear sprockets. Instead of having a conventional chain and sprocket drive, preferably covered by a chain and guard as in this embodiment, the bike could have a shaft drive, also covered by appropriate covers/guards. Such a covered shaft drive would be an alternative way to prevent the child rider from getting his fingers, toes, or other body parts or clothing caught in any portion of the drive mechanism, and thus contribute to the safety of the product.

In another embodiment, both the left and right side crank arms are removable such as via the mechanism shown in FIG. 6, and after being removed both the crank arms are kept elsewhere on the bike out of the way of the rider such as in a special compartment, or retained within a bag that attaches somewhere on the frame, or under the seat, or retained by clips or another keeper mechanism located somewhere on the frame, or are simply stored by the user elsewhere.

Other mechanisms for allowing parts to be relatively locked and unlocked could be employed. As a first example, instead of the threaded bolt 56 extending through the crank arm 50 and crank 40, a quick release pin such as a recessed button quick release pin could be used. Such a quick release pin could also be used to rotationally lock crank arm distal portion 60 relative to crank arm proximal portion 59, such that in order to rotate pedal axle 70 the user first removes the quick release pin, then rotates crank arm distal portion by 90° or slightly more thereby rotating pedal axle 70, then replaces the quick release pin.

It will be understood that the terms "generally," "substantially," "parallel," "coplanar," "orthogonal," "90 degrees," "180 degrees," "opposed," "in opposite directions," "in the same direction," "vertical," "horizontal," and the like as used within the specification and the claims herein allow for a certain amount of variation from any exact dimensions, measurements, arrangements, and orientations, and that those terms should be understood within the context of the description and operation of the invention as disclosed herein.

As will be apparent, the present invention includes a number of separate innovations that can be used together or separately within bicycles. For example, the various folding, telescoping, and otherwise compacting features and mechanisms disclosed herein can be used to make conventional bicycles more compact for easier transportation and/or storage, without the bicycle having a balance bike configuration. Making a conventional bicycle more compact for transportation such as for being placed in the back of a car or for being carried up a set of stairs to an apartment or an office, and particularly without the pedals hitting stationary objects as the bicycle is being carried, is a useful and desirable result in and of itself. Accordingly, it will be appreciated that the term "present invention" encompasses a number of separate innovations which can each be considered separate inventions. Similarly, it will also be appreciated that the term "present invention" as used herein should not be construed to mean that only a single invention having a single essential element or group of elements is presented.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise. Thus, unless expressly stated otherwise, each feature disclosed is one example only of a generic series of equivalent or similar features.

Although the present invention has thus been described in detail with regard to the preferred embodiments and drawings thereof, it should be apparent to those skilled in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

We claim:

1. A child's riding vehicle that converts from a child's balance bike configuration to a pedal powered bicycle configuration, where an X-direction is defined as a direction of travel of the bicycle, a Y direction is defined as transverse to the direction of travel of the bicycle, and a Z-direction is defined as being vertical, the vehicle having:
- a left side pedal crank arm attached to a left side pedal, the left side pedal having an axle;
- a right side pedal crank arm attached to a right side pedal, the right side pedal having an axle;
- a crank about which the left and right side pedal crank arms rotate, the left and right side pedal crank arms being affixed to the crank and providing motive force thereto when the vehicle is being used in the pedal-powered bicycle configuration;
- a lock for selectively locking the left and right side pedal crank arms into:
  - i) a first position in which the left and right side pedal crank arms are parallel to each other and extend in opposing directions, for when the vehicle is being used in the pedal-powered bicycle configuration; and
  - ii) a second position in which the left and right side pedal crank arms are parallel to each other and extend in a common direction, for when the vehicle is being used in the child's balance bike configuration,
- wherein each of said pedals includes a respective pedal spin lock, each respective pedal spin lock selectively prevents a respective one of said pedals from spinning about an associated pedal axis, and each respective pedal spin lock comprises push button spring clips.

2. The child's riding vehicle of claim 1, wherein each of the pedals has a respective pedal platform; and
- each respective pedal spin lock is configured to lock a respective one of the pedals such that the pedal platforms are oriented vertically.

3. A child's riding vehicle that converts from a child's balance bike configuration to a pedal powered bicycle configuration, where an X-direction is defined as a direction of travel of the bicycle, a Y direction is defined as transverse to the direction of travel of the bicycle, and a Z-direction is defined as being vertical, the vehicle having:
- a left side pedal crank arm attached to a left side pedal, the left side pedal having an axle;
- a right side pedal crank arm attached to a right side pedal, the right side pedal having an axle;
- a crank about which the left and right side pedal crank arms rotate, the left and right side pedal crank arms being affixed to the crank and providing motive force thereto when the vehicle is being used in the pedal-powered bicycle configuration;
- a lock for selectively locking the left and right side pedal crank arms into:
  - i) a first position in which the left and right side pedal crank arms are parallel to each other and extend in opposing directions, for when the vehicle is being used in the pedal-powered bicycle configuration; and
  - ii) a second position in which the left and right side pedal crank arms are parallel to each other and extend in a common direction, for when the vehicle is being used in the child's balance bike configuration,
- wherein each of said pedals comprises:
- an outer tube and an inner member concentric therewith;
- a compression spring that biases the outer tube away from the inner member, the inner member and the outer tube having:
  - i) a closer-together position in which the compression spring is relatively more compressed, and
  - ii) a farther-apart position in which the compression spring is relatively less compressed;
- a push button spring clip that enables the inner and outer tubes to be locked together in their closer-together position, while allowing the inner and outer tubes to rotate freely with respect to each other in the farther-apart position.

4. A child's riding vehicle that converts from a child's balance bike configuration to a pedal powered bicycle configuration, where an X-direction is defined as a direction of travel of the bicycle, a Y direction is defined as transverse to the direction of travel of the bicycle, and a Z-direction is defined as being vertical, the vehicle having:
- a left side pedal and a left side pedal crank arm attached thereto, the left side pedal having an axle;
- a right side pedal and a right side pedal crank arm attached thereto, the right side pedal having an axle;
- a crank about which the left and right side pedal crank arms rotate, the left and right side pedal crank arms being affixed to the crank and providing motive force thereto when the vehicle is being used as a pedal-powered bicycle;
- a left side pedal pivot for allowing the left side pedal axle to pivot from a normal position extending a first distance in the +Y direction, to a stowed position extending by less than the first distance in the +Y direction; and
- a right side pedal pivot for allowing the right side pedal axle to pivot from a normal position extending a second distance in the −Y direction, to a stowed position extending by less than the second distance in the −Y direction;
- whereby a width of the vehicle in the Y direction as measured pedal-to-pedal is reduced when the pedal axles are pivoted into their respective stowed positions;
- the child's riding vehicle further comprising left and right side pedal spin locks that respectively and selectively prevent the left and right side pedals from spinning about their respective axles, wherein the left and right side pedal spin locks each comprise push button spring clips.

5. A child's riding vehicle that converts from a child's balance bike configuration to a pedal powered bicycle configuration, where an X-direction is defined as a direction of travel of the bicycle, a Y direction is defined as transverse to the direction of travel of the bicycle, and a Z-direction is defined as being vertical, the vehicle having:
- a left side pedal and a left side pedal crank arm attached thereto, the left side pedal having an axle;
- a right side pedal and a right side pedal crank arm attached thereto, the right side pedal having an axle;
- a crank about which the left and right side pedal crank arms rotate, the left and right side pedal crank arms being affixed to the crank and providing motive force thereto when the vehicle is being used as a pedal-powered bicycle;
- a left side pedal pivot for allowing the left side pedal axle to pivot from a normal position extending a first distance in the +Y direction, to a stowed position extending less than first distance in the +Y direction; and
- a right side pedal pivot for allowing the right side pedal axle to pivot from a normal position extending a second distance in the −Y direction, to a stowed position extending less than the second distance in the −Y direction;
- whereby a width of the vehicle in the Y direction as measured pedal-to-pedal is reduced when the pedal axles are pivoted into their respective stowed positions, wherein each pedal pivot comprises an outer tube and an inner member concentric therewith, the outer tube and the inner member rotatable 90° relative to one another between said normal position and said stowed position;

the child's riding vehicle further comprising left and right side pedal pivot locks, each pedal pivot lock comprising:

a compression spring tending to bias the outer tube and inner member away from each other;

a slot formed in said outer tube, the slot having a first longitudinal segment, a transverse segment, and a second longitudinal segment;

a pin extending outwardly from said inner member and extending into the slot in the outer tube; and left and right side pedal spin locks that respectively and selectively prevent the left and right side pedals from spinning about their respective axles, wherein the left and right side pedal spin locks each comprise push button spring clips, whereby in order to pivot the pedal axle, a user first compresses the outer tube and inner member together against the compression spring thereby moving the pin along the first longitudinal segment of the slot into the transverse segment, then rotates the outer tube relative to the inner member thereby moving the pin along the transverse segment to the second longitudinal segment, then releases the outer tube allowing the pin to move along the second longitudinal segment due to the compression spring moving the outer tube and inner member relatively apart.

* * * * *